United States Patent [19]
Fitzmaurice et al.

[11] Patent Number: 5,973,669
[45] Date of Patent: *Oct. 26, 1999

[54] TEMPORAL DATA CONTROL SYSTEM

[75] Inventors: George W. Fitzmaurice; William A. S. Buxton, both of Toronto, Canada

[73] Assignee: Silicon Graphics, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/701,667

[22] Filed: Aug. 22, 1996

[51] Int. Cl.$^6$ ........................................................ G08G 5/08
[52] U.S. Cl. .......................... 345/157; 345/156; 345/163
[58] Field of Search ...................... 345/156, 157, 345/159, 163, 164, 167, 173, 179; 386/52, 68

[56] References Cited

U.S. PATENT DOCUMENTS

| | | | |
|---|---|---|---|
| 4,933,670 | 6/1990 | Wislocki | 345/184 |
| 5,202,901 | 4/1993 | Mills et al. | 345/157 |
| 5,218,672 | 6/1993 | Morgan et al. | 386/55 |
| 5,453,758 | 9/1995 | Sato | 345/156 |
| 5,477,237 | 12/1995 | Parks | 345/156 |
| 5,530,455 | 6/1996 | Gillick et al. | 345/156 |
| 5,627,531 | 5/1997 | Posso et al. | 345/184 |

OTHER PUBLICATIONS

Pierre Wellner, Communications, Computer Augmented Environments: Back to the Real World, "Digitaldesk", Jul. 1993, vol. 36, No. 7, pp. 87–97.

JL Cooper Electronics, Control Stations—MCS Media control Station, p. 3, May 5, 1995.

Fukuzaki, Y. (1993), Electronic pen according to the BTRON guideline and its background, TRONWARE, vol. 4, Personal Media Publishers, Japan, pp. 49–62.

Steve Lohr, "A Hardware Team Offers A Mouse That Can Zoom" Microsoft Sees Major Shift Coming to PC's, *The New York Times*, Monday, Jul. 22, 1996.

Wendy E. Mackay, "Augmenting Reality: A new paradigm for interacting with computers", La recherche 285, Mars 1996.

Serial No. 511,479, William A.S. Buxton and George W. Fitzmaurice, "System and Method for Controlling Temporal Digital Media", filed Aug. 4, 1995.

Videocassette Recorder, Model: PVW–2800, Operating Instructions, Sony, 1991, pp. 2–6 Through 2–10 and 4–12 through 4–15.

Mel Slater et al., "Liberation from Flatland: 3D Interaction Based on the Desktop Bat", Eurographics '91, pp. 209–221.

*Primary Examiner*—Matthew Luu
*Attorney, Agent, or Firm*—Staas & Halsey LLP

[57] ABSTRACT

A temporal data control system that uses a hand held, mobile scrubwheel that includes two position indicators and an activation switch. As a user moves the scrubwheel about on a surface of a position sensing tablet a computer controls the movement of a cursor on a display. The computer also displays one or more temporal sequences, such as video sequences, on the display. Movement of the scrubwheel is detected by the computer allowing the user to position the cursor on a sequence to be controlled which the computer interprets as selecting the sequence. The computer detects rotation of the scrubwheel and controls the forward and backward motion (and speed) of the sequence responsive to the rotation. By moving the device to another location on the surface the user can select another sequence to control. The user can "point-and-scrub" temporal sequences.

18 Claims, 6 Drawing Sheets

TEMPORAL DATA CONTROL SYSTEM

BACKGROUND OF THE INVENTION

1. Field of the Invention

The present invention is directed to system for controlling the display of temporal data, such as a video sequence and, more particularly, to a system that provides a mobile scrubwheel that can be used to not only select the temporal data to be controlled but also to make the temporal data move forward or backward in time.

2. Description of the Related Art

In editing motion video images the editor is typically provided with a control board that allows the user to cause a temporal image or a video sequence to move forward and backward at various speeds as well as to pause. The forward and backward motion is often controlled by a wheel set within the control board that is sometimes called a "scrubwheel" or a "jog/shuttle wheel". As the editor rolls the scrubwheel one direction the video sequence moves forward and as the wheel is rolled in the other direction the sequence goes backward. Typically a single control board can be used to control several monitors and video sequences with a monitor dedicated to a particular video sequence. The set of controls for the particular monitor include the scrubwheel providing a scrubwheel that is dedicated to the particular monitor and video sequence. When the editor wants to control a different video sequence a different set of controls (scrubwheel) may be used or a single control unit may be used (switching between the various video signals using pushbuttons).

Today, video as well as other temporal data editing, such as for animation sequences and music, is being done with computers. These editing systems often show two or more sequences on the same display with the sequences being controlled by the single computer. The temporal data is often divided into frames such that one picture of a video sequence corresponds to one frame. Typically, the user must use an input device, such as a mouse, to select a video sequence to be controlled, to select a displayed tool with which to control the sequence, such as a slider, and to then manipulate the displayed tool to control the motion of the sequence. The user must go through the same steps to control a different video sequence. This type of control is awkward and slow.

What is needed is a system that allows the user to display several video sequences simultaneously and use the same device to select and control the sequences without the need for displayed tools.

SUMMARY OF THE INVENTION

It is an object of the present invention to provide a device that can both point to and select a temporal sequence, such as a video sequence, as well as control the temporal movement of the sequence.

It is another object of the present invention to replace on screen displayed tools with a physical device.

It is an additional object of the present invention to provide a hand held device that is easy for a user to manipulate.

The above objects can be attained by a hand held, mobile device that allows a user to move the device about on a surface, resulting in the movement of a cursor on a display, onto a sequence to be controlled, to thereby select the sequence. The hand held device is then manipulated to control the sequence. By moving the device to another location on the surface the user can select another sequence to control.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention is directed to a mobile scrubwheel that allows a user to point to and manipulate temporal data, such as a video sequence, a music sequence, an animated graphic sequence, etc. This is achieved through an input device to be discussed in detail herein and a simple interaction technique similar to that used with a conventional mouse and where the idea is to "point and scrub" to select and control the sequence.

The invention is particularly designed to facilitate the manipulation of multiple streams of computer based, digital, temporal media, such as video or animations. Traditional interactions with a computer involve using the mouse as a pointing device and manipulating dedicated on-screen user interface widgets such as scrollbars or VCR-like controls. The sequence typically involves two distinct stages of interaction: (1) selecting the window that contains the temporal data (e.g., video or animation) and (2) manipulating the temporal data by using user interface widgets. The "point and scrub" interaction of the present invention combines these two phases into one combined gesture. In the invention the computer pointing device and scrubwheel are combined into one physical input device. The physical form of the input device suggests and facilitates the functionality it offers, namely scrubbing temporal media. On-screen user interface control widgets are replaced by using the physical device. Thus, screen space is saved. In addition, the user does not have to make a precise selection with the cursor into a typically very small, on-screen user interface (UI) control widget. Instead, the user just needs to position the device anywhere in the video or animation window and manipulate the device. Preferably, the mobile scrubwheel, as will be discussed in more detail later, is primarily made of transparent material to allow for it to operate directly on a computer screen with an integrated or superposed transparent digitizing tablet. Thus, the input device does not obscure the underlying temporal data while at the same time allowing users to operate directly on the data of interest. The act of point-and-scrubbing is a very natural and intuitive gesture.

Figure 1:
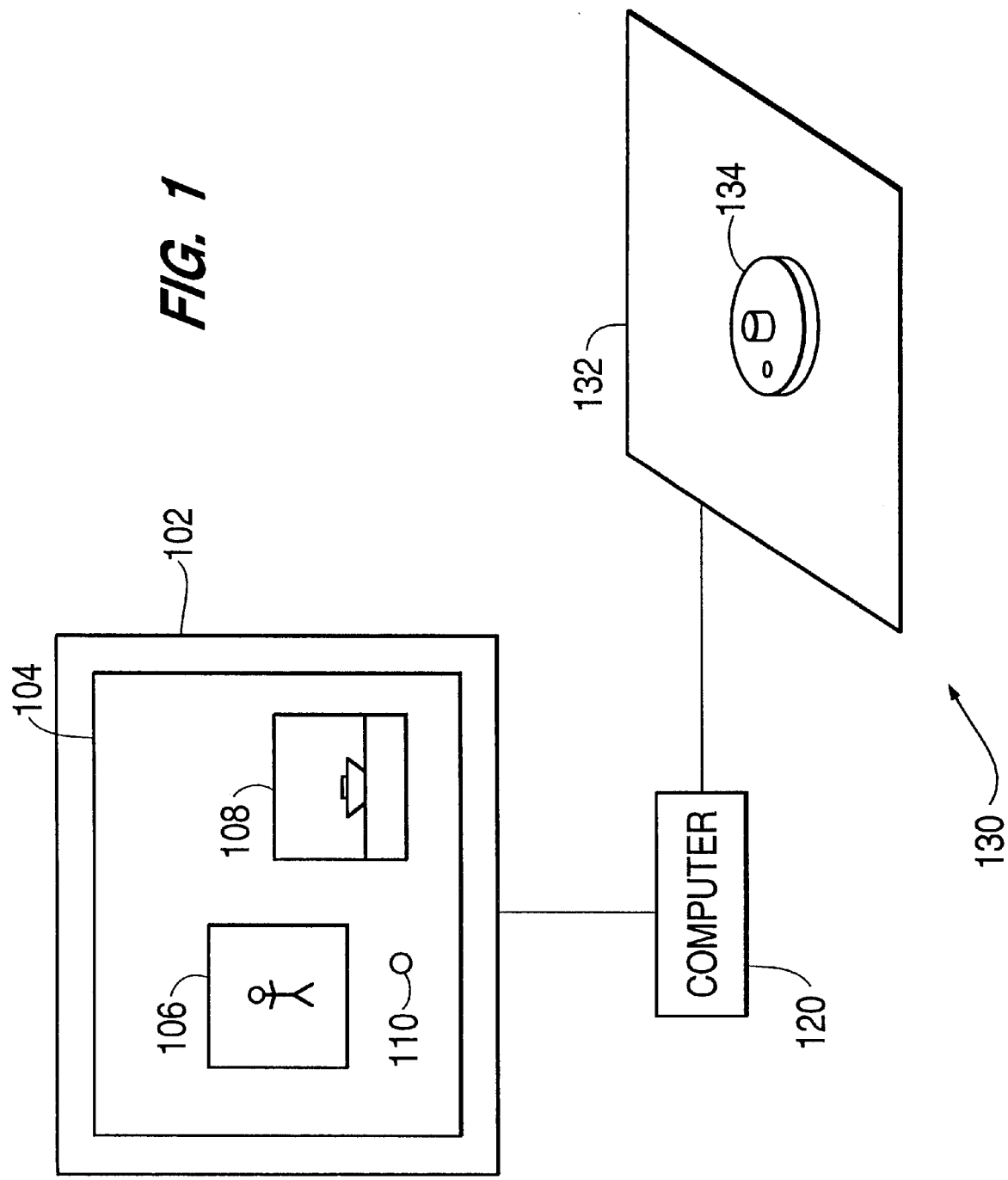
FIG. 1 depicts a system 100 according to the present invention.

The present invention, as illustrated in FIG. 1, is a system 100 that includes a display unit 102 including a display 104 for displaying one or more windows, with two windows 106 and 108 shown. The windows 106 and 108 display temporal data, such as a video sequence, that is to be controlled. The display 104 also displays a cursor 110 that can be manipulated by the user to select which window to control by positioning the cursor 110 on the window. The system also includes a computer 120 that produces the display 104 and allows the user to interact with the display 104. The computer 120 executes a conventional program, such as Flipbook available from Alias/Wavefront of Toronto, Canada that allows a user to control the video temporal sequences of the windows 106 and 108. The computer 120 also includes the typical storage devices, such as hard and floppy disks, upon which the process of the present invention can be stored. The computer 120 and display unit 102 are conventional work station type systems available from companies such as Silicon Graphics, Inc. The system 100 also has an input device 130 including a tablet 132 and a hand held, mobile scrubwheel 134 shaped somewhat like a hockey puck. The tablet 132 is a conventional tablet such as model UD-1218 available from Wacom Technology, Inc. of Japan and that is used with "stylus" and "puck" type input devices also available from Wacom. As the user slides the scrubwheel 134 on the surface of the tablet 132, the tablet 132 produces a position signal that indicates the location of the scrubwheel 134 on the tablet 132 and which is used to position the cursor 110 in the display 104, particularly on or in one of the windows 106 and 108. As the scrubwheel 134 is spun or rotated about its central axis the tablet 132 outputs a signal, which will be discussed in more detail later, indicating the direction and speed of rotation which, when the cursor is on a window, is used to control the direction and speed of the temporal sequence.

Figure 2:
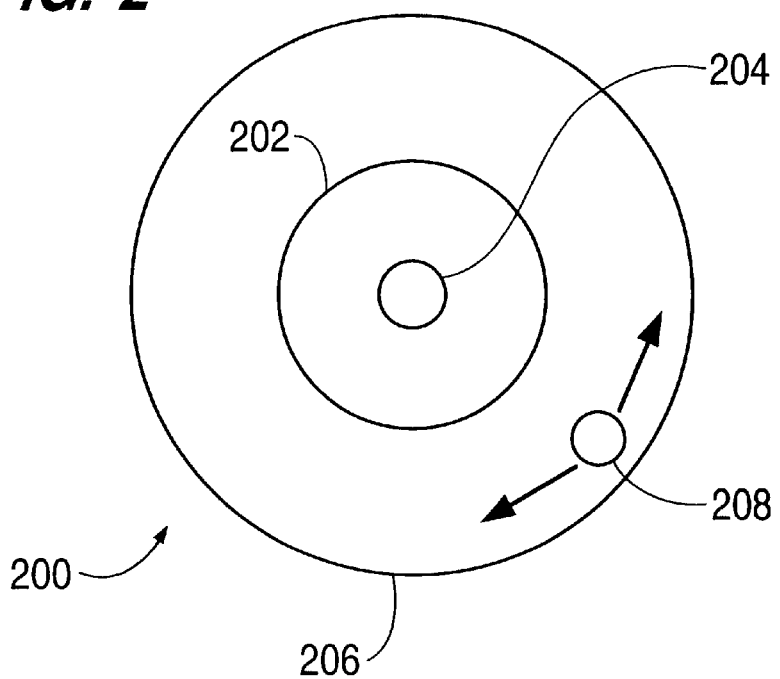
FIG. 2 is a top view of a scrubwheel 200 in accordance with the present invention.

As illustrated in the top view of FIG. 2, the scrubwheel 200 includes a disk shaped base or core 202 that contacts a surface of the tablet 132 and that includes a position indicator 204 located in the center of the core 202 and which indicates the position of the scrubwheel 200 to the tablet 132. The indicator 204 is preferably a cordless position sensor which is a ring shaped coil available from Wacom as model UC-520-12 and typically used in the Wacom "puck" input type control device. The scrubwheel 200 also includes a rotating disk 206 attached to the core 202 and which rotates about the center of the core 202. Embedded in the periphery of the disk 206 is another position indicator 208 that moves about the center of the scrubwheel as the disk 206 rotates, as depicted by the arrows. The indicator 208 is preferably another cordless position sensor which is a stick shaped coil available from Wacom as model 4DA and typically used in the Wacom "stylus" type input control device. The indicators 204 and 208 alter or change the electromagnetic field produced by the tablet 132 allowing the tablet 132 to detect the position of the indicators 204 and 208. The use of two different types of position indicators allows the tablet 132 to output two different position signals. These signals are serially produced at 205 samples per second and provide the x-y coordinates of the positions or planar positions of the indicators on the tablet 132.

Figure 3:
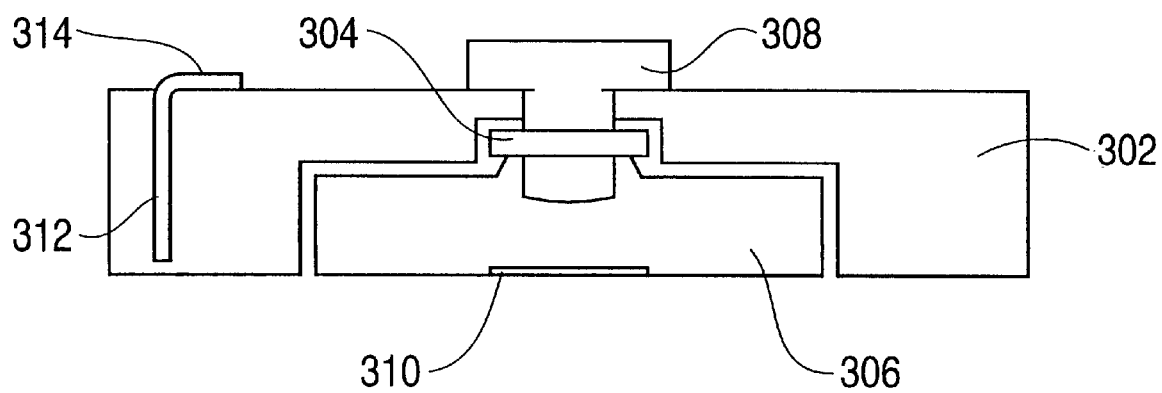
FIG. 3 is a side cutaway view of a scrubwheel 300 according to the present invention.

As depicted in the cutaway side view of FIG. 3, the rotating disk 302 of the scrubwheel 300 rests on a ball bearing 304 mounted on the core 306. The disk 302 is held in place by a tightening screw 308 that passes through a hole in the disk 302. The screw 308 screws into a threaded hole in the core 306 through the bearing 306 such that the disk 302 is allowed to rotate on the bearing 306. The screw 308 allows the tension between the disk 302 and core 306 and the ease with which the disk 302 can be rotated to be adjusted.

The ring shaped indicator 310 (see also 204 of FIG. 2) is positioned at the bottom and in the center of the core 306 to rest just above the surface of the tablet 132. The stick shaped indicator 312 is embedded in the periphery of the disk 302 with one end just above the surface of the tablet 132 and is connected to a switched button 314 through a control circuit board which is not shown and which is provided with the coil by Wacom. The closing of the switch 314 changes the way in which the indicator 312 affects the field produced by the tablet 132 allowing the tablet 132 to detect the closing of the switch 314.

Figure 4A:
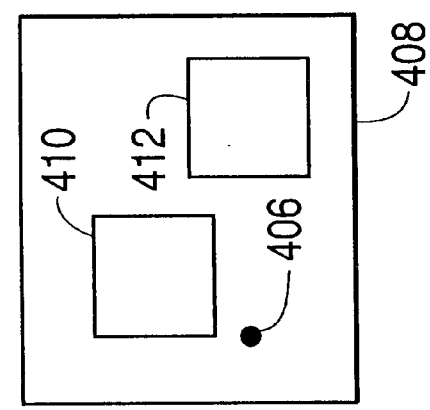
FIGS. 4A–4C depict cursor control and sequence selection according to the present invention.
Figure 4A:
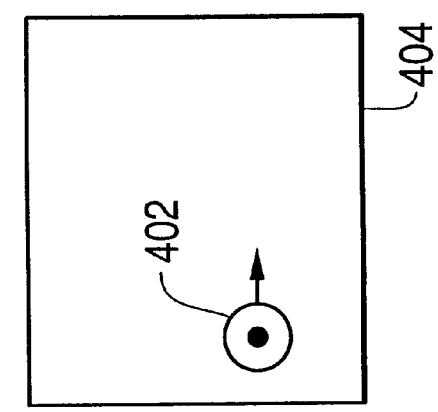
Figure 4B:
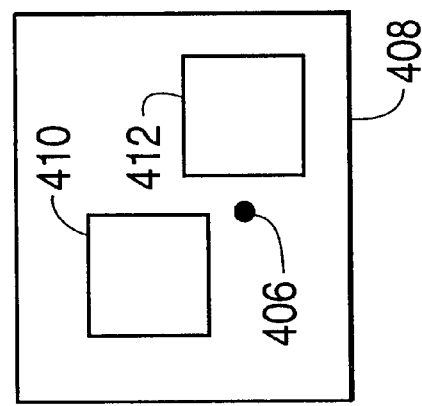
Figure 4B:
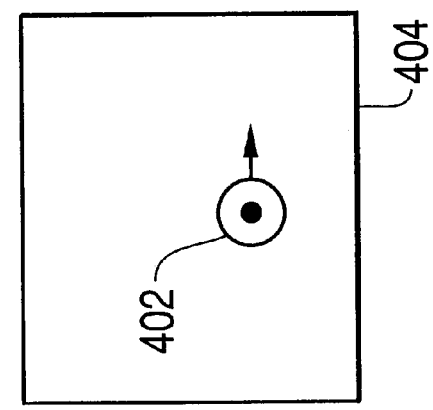
Figure 4C:
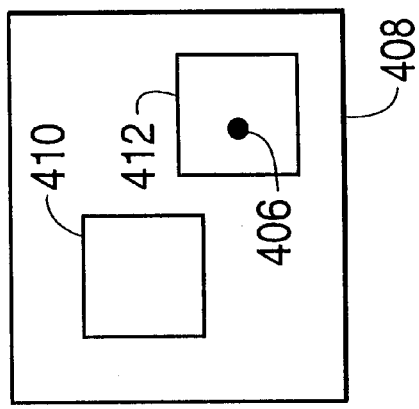
Figure 4C:
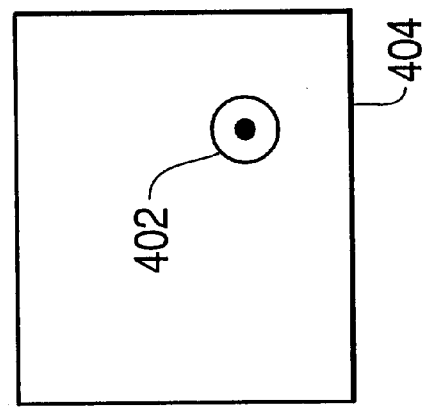

FIGS. 4a–4c illustrated a sequence of movements by a scrubwheel 402 on a tablet 404 and the corresponding movement of the cursor on a display 408 containing two windows 410 and 412 displaying two different video sequences resulting in a selection of the window 412 and the corresponding video sequence. As can be seen, as the scrubwheel 402 is moved on the tablet, a corresponding movement of the cursor occurs in the display 408. When the cursor 406 is outside the windows, as shown in FIGS. 4a and 4b, the system of the present invention does not detect, determine or indicate that the window has been selected using a conventional window cursor comparison operation. However, when the cursor 406 is moved within a window, as shown in FIG. 4c, the system detects that the window has been selected. That is, FIG. 4c shows a selection of window 412 while FIGS. 4a and 4b do not show a window selection. Note that if the cursor 406 is moved off the window even while the scrubwheel is being rotated to perform sequence control the window will be deselected and sequence control will stop.

Figure 5A:
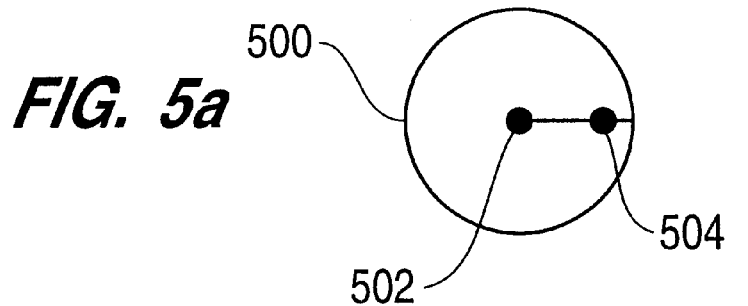
FIGS. 5A–5E depict scrubwheel motion during forward and backward control.
Figure 5B:
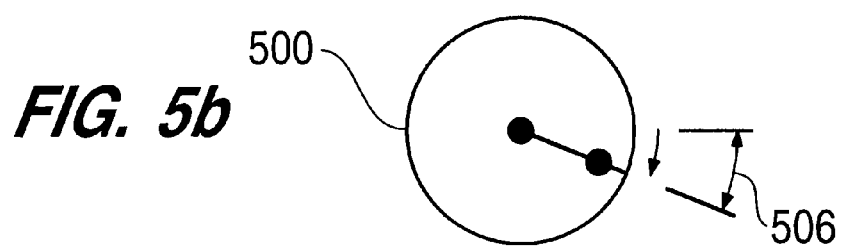
Figure 5C:
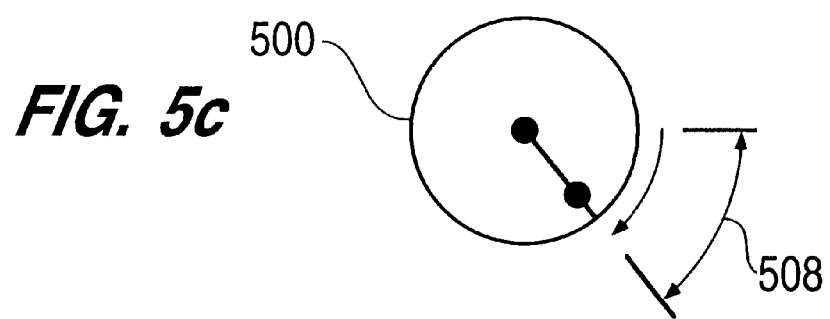
Figure 5D:
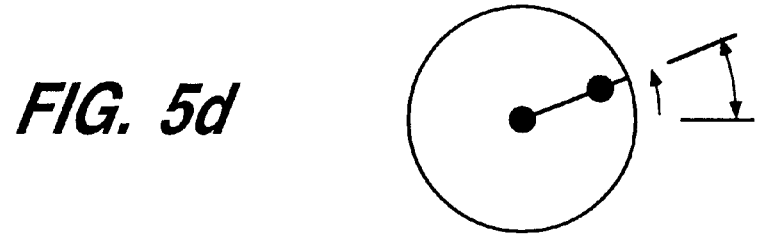
Figure 5E:
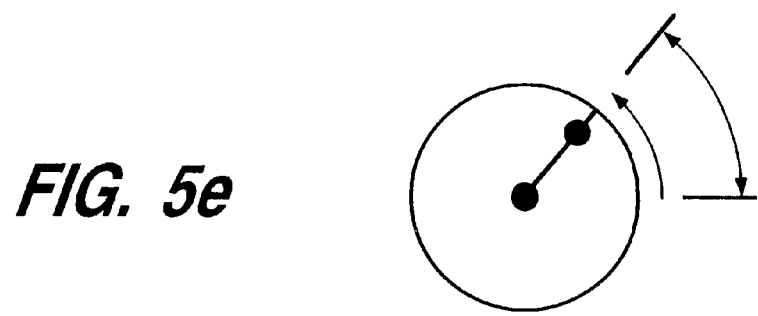

As previously mentioned, the rotation of the scrubwheel is detected and used to control the movement of the temporal sequence. This is depicted in FIGS. 5a–5e. FIG. 5a depicts the starting position for the rotational position of a scrubwheel 500. By rotating the scrubwheel 500 a small distance clockwise as depicted by FIG. 5b the sequence moves forward only one time period or frame, such as moving forward one picture in a movie. If a forward movement of multiple frames is desired the scrubwheel 500 is rotated further as depicted in FIG. 5c. Continued rotation of the scrubwheel 500 in the direction shown by FIGS. 5a–5c will result in further forward movement. The amount of rotation or the angle formed between the original, starting or reference position of the scrubwheel 500 and the subsequent position is used to determine the amount or magnitude of the movement of the sequence. The angle is determined by using the center 502 of the scrubwheel 500 where the ring position indicator is located at the vertex and the positions of the stick shaped indicator 504 as the sides of the angle. FIG. 5b depicts a small angular change or angle 506 corresponding to a single frame advance while FIG. 5c depicts a large angle 508 corresponding to a multiple frame advance. FIGS. 5a,5d and 5e depict backward sequence movement by one time period (FIG. 5d) and multiple time periods (FIG. 5e) as the scrubwheel 500 is rotated counter clockwise.

The number of frames that the sequence jumps forward on the display depends on the amount of rotational movement. If the scrubwheel 500 is rotated forward slowly the frames are shown one at a time in their sequential order. For example, if the angle is between x and y degrees, the system retrieves and displays the next frame. FIGS. 5a and 5b depict this slow movement. If the scrubwheel 500 is rotated forward very fast the display of the frames will skip forward such that one or more frames of the sequence will not be displayed. For example, if the angle is between w and z degrees, the system retrieves and displays the third frame, thereby skipping two frames. FIGS. 5a and 5c illustrate a fast rotation that can result in frames being skipped.

If the present invention is used with a video sequence that is already playing at a normal speed, the present invention can be used to control the speed of play-back. If the scrubwheel is rotated in a forward direction the play-back can be speeded up. For example, if the forward rotation is between d and f degrees, the system skips one frame during the retrieval and display. If rotated slowly in the backward direction the play-back would move in slow motion. For example, if the backward rotation angle is between a and b degrees, the system repeats the display of each frame twice as the sequence moves forward. If rotated backward faster the play-back would pause (for a backward rotation angle of between g and h degrees, the system repeats the same frame) and if rotated backwards even faster the play-back would reverse (for a backward angle of between i and j degrees, the previous frame is retrieved and displayed).

Figure 6:
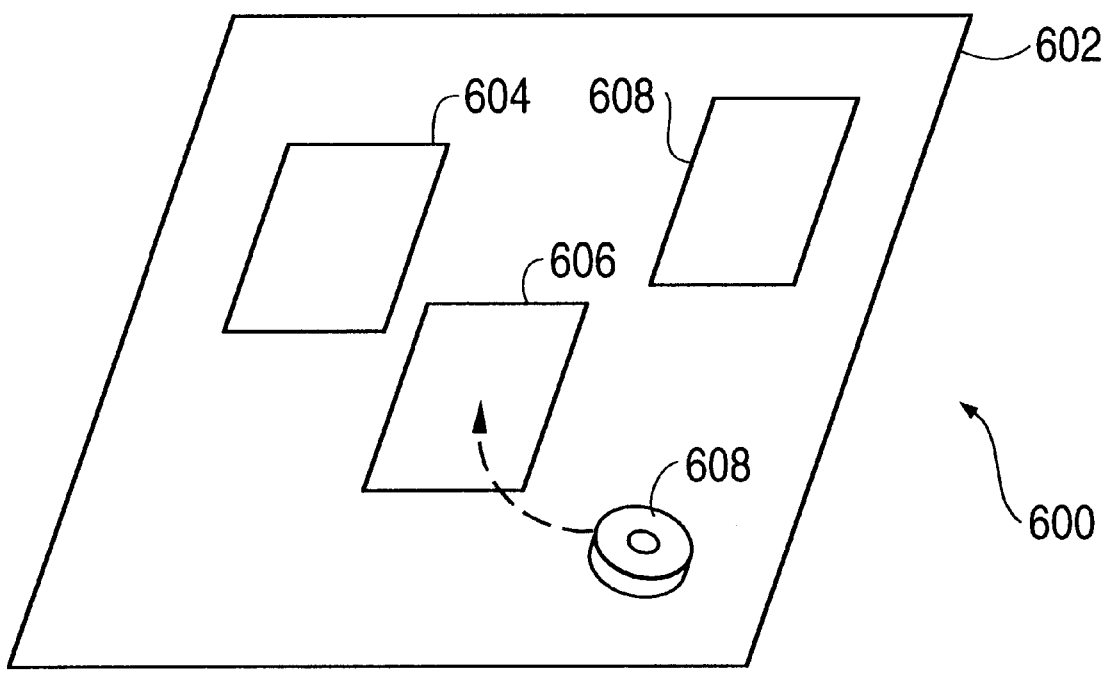
FIG. 6 depicts another input system 600 in accordance with the present invention.

FIG. 1 depicts the tablet 132 or position sensing mechanism as separate from the display unit 102. The present invention can integrate the position sensing mechanism into the display unit so that an input system 600 in the form of a display/tablet 602 can be created, as illustrated in FIG. 6. This display/tablet 602, which is shown displaying several temporal data windows 604, 606 and 608, can be positioned in a desk top with the surface of the display/tablet 602 oriented horizontally. The scrubwheel 608 will rest on the display allowing the scrubwheel 608 to be moved onto the window 606 that is to be controlled, as illustrated by the dashed line. In this embodiment the display need not display the cursor. However, for the user to be able to view the sequence in the window being controlled the window needs to be substantially larger than the scrubwheel 608 and the scrubwheel 608 needs to be transparent, such as would be the case when made of transparent plastic.

Figure 7:
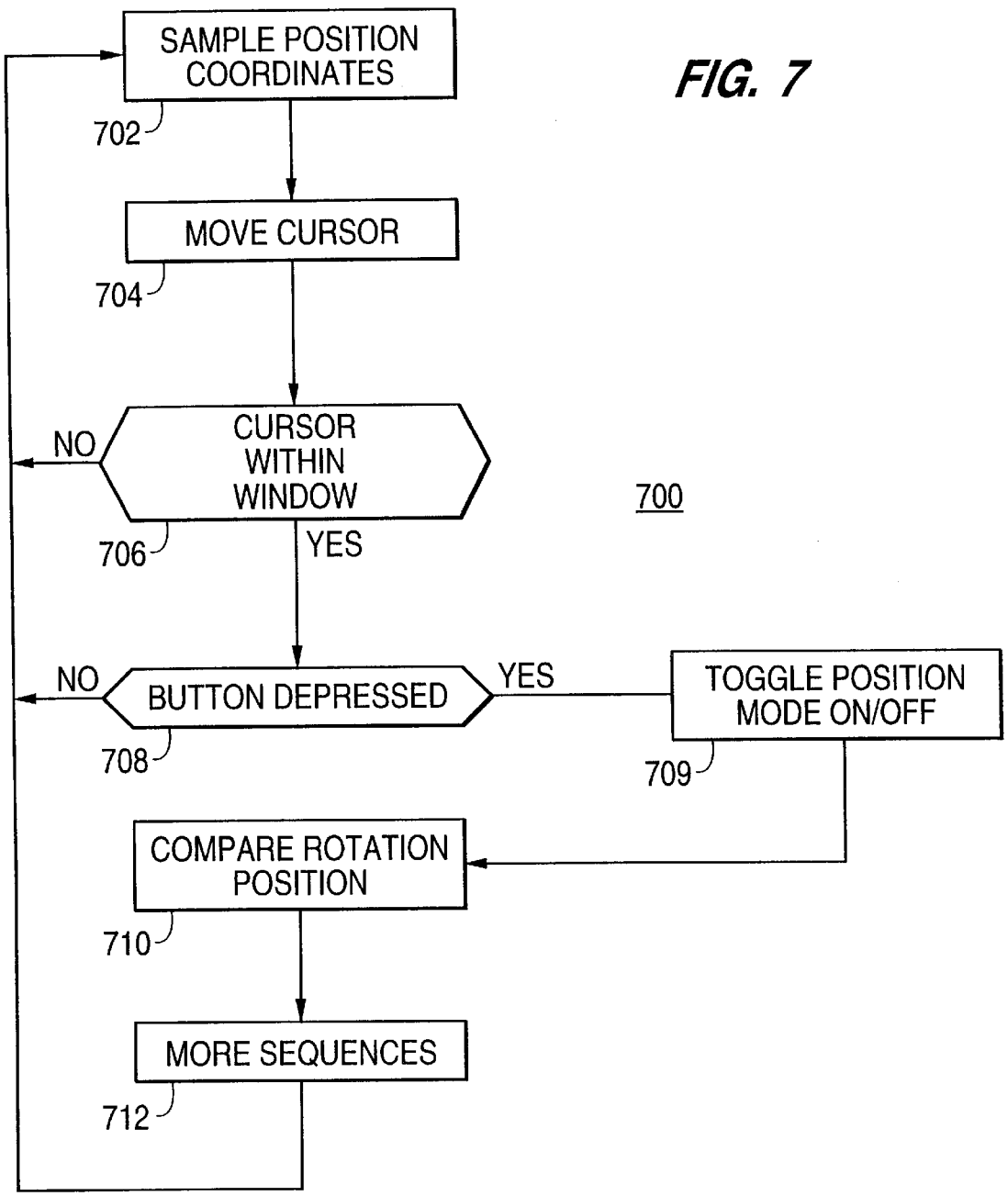
FIG. 7 is a flow chart of a process for controlling a temporal sequence in accordance with the present invention.

The process 700 of the present invention is illustrated by the block diagram of FIG. 7. The process is preferably implemented in a language such as C. The process starts by sampling the positions of the two position indicators as output by the tablet. If the position of the ring shaped indicator has moved the position of the cursor is moved 704 accordingly. The system then determines 706 whether the cursor is within a window for a temporal sequence. If so, a window and temporal sequence has been selected for motion control. The system then checks 708 to see if the button has been activated indicating that sequence control is to be effected. When the button has been activated the system toggles 709 the playback mode (on,off).

During the playback mode, the system compares the position of the stick shaped position indicator with a saved, immediately preceding position and determines 710 the angle or rotational position. Based on the amount or angle of rotation the temporal sequence is moved 712 forward or backward accordingly. The process of the present invention is described with additional detail in the attached pseudocode Appendix.

This discussion has described the motion control for positioning the cursor and for controlling the temporal sequence using a description of absolute position control where, for example, the position of the scrubwheel on the tablet corresponds to the position of the cursor on the display. The present invention can also use a relative control strategy, like that used in a conventional mouse, where the starting position of the scrubwheel and the ending position of the scrubwheel control the direction and distance of cursor movement on the display from a cursor starting position. Rate control can also be used.

The scrubwheel of the present invention discussed in detail herein orients the rotating disk horizontally. It is also possible to orient the disk vertically. The disk can also be partially enclosed so that only part of the disk can be touched during rotation.

The present invention has also been described with respect to the input device being a scrubwheel. It is also possible for the input device to take other forms, such as a mouse with a thumb wheel where the position of the mouse controls the cursor and the thumb wheel controls the motion of the temporal sequence. Instead of a wheel, the buttons of the mouse could be manipulated to control forward and backward sequence control. Input devices which maintain the cursor in the window while allowing a control function to be performed are devices generally suitable for the present invention.

The present invention has also provided a discussion of temporal sequence data control that has focused on visual type data. However, temporal sequence data can be any type of data that has a time based component, such as stock market price data. The data being controlled also need not have a time component and data with an order, such as a front-to-back order like a list of names in alphabetical order or the text of a book, can also be controlled using the present invention.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX

```
Read sample device data
If device in same video window
        continue
else if device in new video window
        switch video controls to new window
        reset previous input device sample values
to current data
else /*      not over a video window, so don't process
*/
        return
Compare new device data with previous sampled data
If device = scrubwheel {
        compute angle using previous and current
input device samples
        if rotating clockwise:
                if rotation change is small, go
forwards a single frame
                if rotation change is large, go
forwards multiple frames
        else    /* rotating counter-clockwise */
                if rotation change is small, go
backwards a single frame
                if rotation change is large, go
backwards multiple frames if scrubwheel button pressed {
                if in playback mode then
                        stop playback
                else if not in playback mode then
                        start playback
        }
```

APPENDIX-continued

```
}
If device = mouse {
            if left mouse button hit, qo backwards a
    frame
            if middle mouse button hit, go forwards a
    frame
}
```

What is claimed is:

1. A computer system having a program displaying a data sequence, allowing a user to translate a mobile input device in an input plane to move a cursor onto the sequence to select the sequence and allowing the user to rotate the device around an axis substantially orthogonal to the input plane to control the sequence.

2. A system as recited in claim 1, wherein the device is transparent and the user moves the device onto the sequence to select the sequence.

3. A system as recited in claim 1, wherein the user moves a cursor onto the sequence by moving the device to select the sequence.

4. A system as recited in claim 1, wherein rotating the device does not move the cursor.

5. A system as recited in claim 1, wherein a rotational direction controls sequence direction.

6. A system as recited in claim 1, wherein when the sequence is playing, the rotation controls a speed of the playing.

7. A system as recited in claim 4, wherein the cursor remains positioned on the sequence during the control.

8. An apparatus, comprising:
    a display displaying a temporal sequence and a cursor;
    a mobile rotatable input device mobile within an input plane and rotatable about an axis orthogonal to the input plane; and
    a computer coupled to said display and said device, translating the cursor responsive to a position of said device in the input plane to move a cursor onto the sequence to select the sequence and controlling the temporal sequence responsive to rotation of said device.

9. A temporal data sequence control system, comprising:
    a display displaying at least two temporal data sequences in separate windows and displaying a cursor;
    an input device, comprising:
        a hand held, mobile scrubwheel movable by a user, comprising:
            a disk shaped core having a ring shaped first position indicator located in a center of said core, having a screw hole in the center of said core and a bearing mounted around the screw hole; and
            a rotatable disk resting on the bearing, having a stick shaped second position indicator located in a periphery of said disk, and a switch connected to the second indicator and switchable by a finger of the user; and
        a tablet on which the scrubwheel rests and can be moved, detecting the positions of the first and second position indicators and detecting a switched condition of the switch; and
    a computer connected to said tablet and said display, controlling a position of the cursor on said display responsive to a position of the first position indicator to select one of the temporal data sequences when the cursor is in the window of one of the temporal data sequences and controlling the one of the temporal data sequences responsive to a position of the second position indicator as the second position indicator rotates about said core when said disk rotates and to the switched condition of the switch.

10. A storage media storing a process for displaying a temporal sequence, allowing a user to translate an input device in an input plane to move a cursor on the temporal sequence using the input device to select the sequence and allowing the user to control the sequence with the input device by rotating the device about an axis orthogonal to the input plane.

11. A sequence data control process, comprising:
    allowing a user to translate a cursor to move the cursor onto a sequence to select the sequence to be controlled using an input device in an input plane; and
    allowing a user to control the sequence by rotating the device about an axis orthogonal to the input plane.

12. A system as recited in claim 1, wherein the input device is a disk rotating in a plane oriented parallel to a surface upon which the input device rests.

13. A computer system having a program displaying a temporal data sequence, allowing a user to translate a mobile input device within an input plane to move a cursor onto the temporal sequence to select the temporal sequence and allowing the user to rotate the device about an axis orthogonal to the input plane to directly control the temporal sequence.

14. A system as recited in claim 1, wherein said input device comprises a disk with a circumferential side surface parallel to the axis and a top surface orthogonal to the axis allowing fingers to be positioned on the side and top surfaces during sequence control.

15. A system as recited in claim 1, wherein said input device comprises a control surface adapted such that finger contact with the control surface does not have to be broken to control an entire range of the sequence.

16. A computer system having a program displaying a data sequence, allowing a user to translate a mobile input device in a horizontal input plane to move a cursor onto the sequence to select the sequence and allowing the user to rotate the device around an axis substantially orthogonal to the input plane to control the sequence.

17. A computer system having a program displaying a data sequence, allowing a user to translate a mobile input device in an electromagnetic field sensor input plane to move a cursor onto the sequence to select the sequence and allowing the user to rotate the device around an axis substantially orthogonal to the input plane to control the sequence.

18. A computer system having a program displaying a data sequence, allowing a user to translate a mobile input device in a substantially horizontal, electromagnetic field sensor tablet input plane to move a cursor onto the sequence to select the sequence and allowing the user to rotate the device around an axis substantially orthogonal to the input plane to control the sequence.

* * * * *